United States Patent
Randolph

[11] 4,017,835
[45] Apr. 12, 1977

[54] SYSTEM FOR VERIFYING CREDIT STATUS

[76] Inventor: Richard D. Randolph, 3212 Colfax, Pueblo, Colo. 81008

[22] Filed: Feb. 11, 1974

[21] Appl. No.: 441,649

[52] U.S. Cl. .................. 340/152 R; 235/61.7 B; 179/2 CA
[51] Int. Cl.² ............... G06F 3/14; H04M 11/06; H04Q 9/00
[58] Field of Search ........... 340/152 R, 153, 149 A; 179/2 CA; 235/61.7 B

[56] References Cited

UNITED STATES PATENTS

| | | | |
|---|---|---|---|
| 3,299,210 | 1/1967 | Bandy | 340/152 R |
| 3,344,401 | 9/1967 | MacDonald et al. | 340/152 R |
| 3,576,539 | 4/1971 | Huber et al. | 340/152 R |
| 3,581,072 | 5/1971 | Mymeyer | 340/149 R |
| 3,617,638 | 11/1971 | Jochimsen et al. | 179/2 DP |
| 3,697,693 | 10/1972 | Deschenes et al. | 340/152 R |
| 3,787,623 | 1/1974 | Stephenson, Jr. | 340/152 R X |
| 3,818,187 | 6/1974 | Lovendusky et al. | 235/61.7 B |
| 3,821,480 | 6/1974 | Dundon et al. | 340/152 R |
| 3,821,705 | 6/1974 | Chertok et al. | 340/149 A X |
| 3,826,872 | 7/1974 | MacGregor | 179/15 A |
| 3,833,885 | 9/1974 | Gentile | 340/152 R |
| 3,852,571 | 12/1974 | Hall et al. | 340/149 A X |
| 3,931,614 | 1/1976 | Vasa et al. | 340/152 R X |

*Primary Examiner*—Donald J. Yusko
*Attorney, Agent, or Firm*—Ancel W. Lewis, Jr.

[57] ABSTRACT

A credit status verification system and method that affords high flexibility for use by merchants and bankers has a high speed, high capacity, on-line, real time computer which stores data concerning the credit status of the bearer of a particular decimal number, usually a customer bank account number. A plurality of terminal units in stores and/or banks generate input messages in a binary coded digital signal form to be received by the computer, and the computer produces output messages in a binary coded digital signal form to be sent to the terminal units preferably over telephone lines. A polling unit at the computer is used to continuously interrogate the terminal units to see if they are operational and if they have any input messages ready and also recognize poll-type input messages. Address characters with the messages locate the terminals and identify the incoming messages. A converter is used at the computer to step down the speed and change codes for output messages while changing them to asynchronous and to step up the speed and change codes for input messages while changing them back to synchronous. Interface controllers for the terminal units facilitate one controller remote from the computer for a plurality of terminal units, distinguishes between poll-type and response-type messages, and identifies the terminal unit for receipt of the input messages by the computer.

3 Claims, 5 Drawing Figures

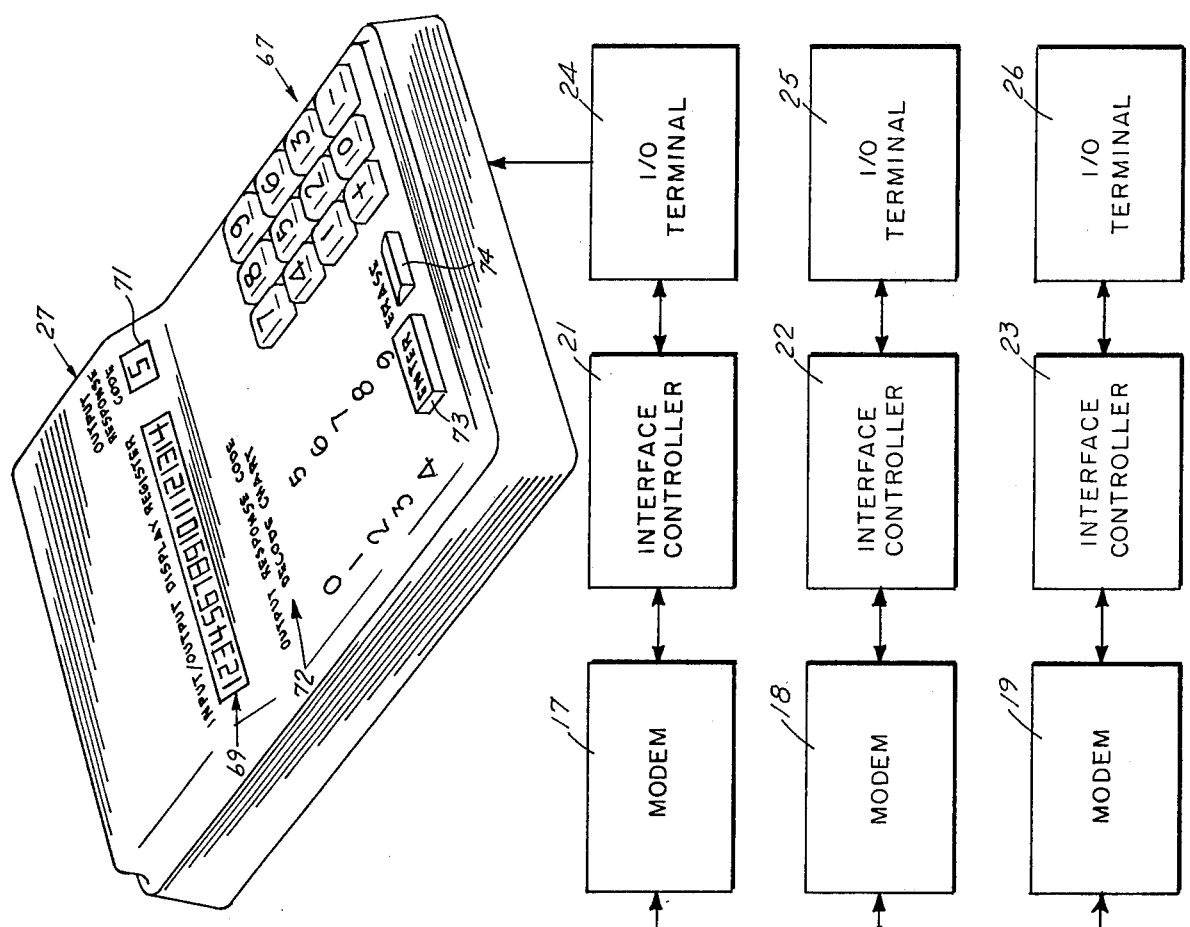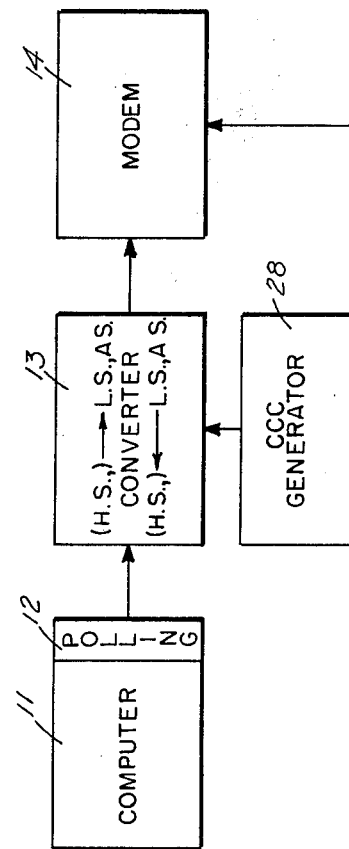

SYSTEM FOR VERIFYING CREDIT STATUS

FIELD OF THE INVENTION

This invention relates to a system and method for verifying the credit status of the bearer of a particular decimal number, such as the customer bank account number on a check, credit card number, or bank number to aid the merchant and banker in the reduction of short checks, defective credit cards and the like.

BACKGROUND OF THE INVENTION

The status of the credit of a purchaser at a retail merchant store is of increasing concern to merchants that frequently come up short by virtue of a lack of funds. Banks also have a vital interest in reducing the number of bad checks presented to them to aid in their sale of ready reserve accounts, guaranteed check cards and reducing bookkeeping costs. With a way of detecting short checks at the time of purchase, banks are able to help their commercial customers hold down their losses and keep the consumer by the eventual lowering of prices by reduction of merchant's losses.

Some attempts have been made to provide a system and method for verifying credit status, but have not been entirely satisfactory due to an inadequate data base, inadequate storage capabilities, slowness in response, vagueness in responses or answers, and excessive costs in relation to the value to the merchant. The "negative" method or system typically stores bad accounts, and a "positive" system or method typically provides a credit balance.

Accordingly, it is an object of this invention to provide a novel system and method for verifying the credit status in a fast yet relatively inexpensive manner which has the capability of operating continuously 24 hours a day.

Another object of this invention is to provide a novel system and method of verifying the credit status of a customer without undue demands on a relatively large, high capacity computer and yet utilize the speed and storage capacity advantages of such a computer over a multi-state area.

Yet a further object of this invention is to provide a novel system and method of verifying credit status that would be beneficial to both bankers and merchants in reducing the number of short checks and providing a balance verification.

Still another further object of this invention is to provide a novel credit status verification system and method that has the capabilities of providing a range of information about the credit status of a customer suitable for use either as a positive system or negative system and will service a relatively large number of relatively inexpensive terminal units through a single interface controller operable in association with a telephone line.

Other objects, advantages and capabilities of the present invention will become more apparent as the description proceeds when taken in conjunction with the acompanying drawings in which:

BRIEF DESCRIPTION OF THE DRAWINGS

FIG. 1 is a schematic block diagram showing a system for verifying credit status embodying features of the present invention.

FIG. 2 is a diagram illustrating the output message formats for the system of FIG. 1.

FIG. 3 is a diagram illustrating the input message formats for the system of FIG. 1.

Figure 4:
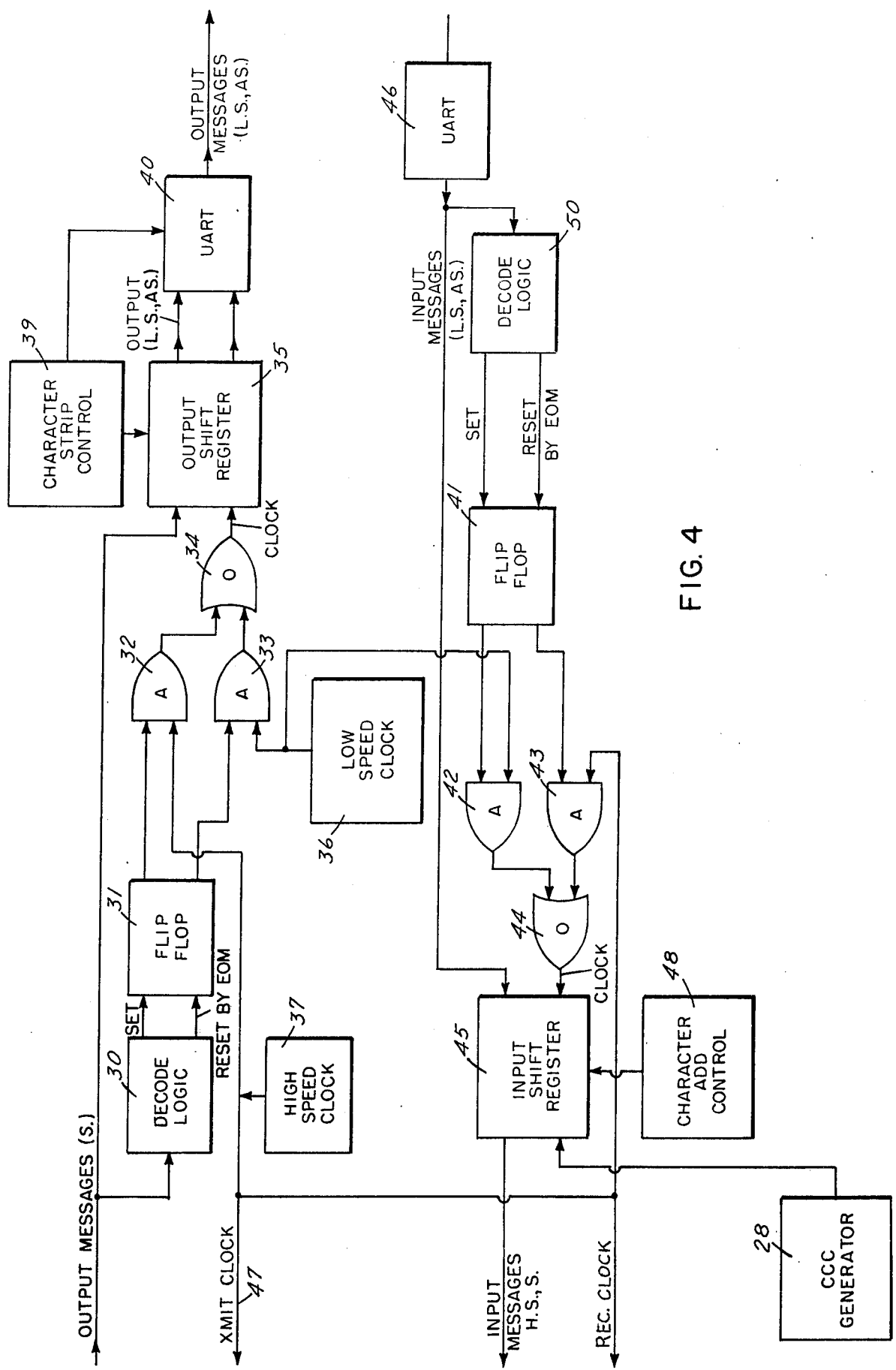
FIG. 4 is a schematic block diagram of the converter for the system of FIG. 1.

The following document may be consulted for additional information currently available on the elements described in this application: *IBM Data Process Applications Introduction to Programmed Airline Reservation System PARS*, No. E20-0290, 1967.

DEFINITION OF TERMS bit — a quantity of data consisting of one binary digit.
asynchronous — the transmission of bits of serial data in which the time interval between successive bits is not controlled by a clock.
message — a unit of data transmission consisting of one or a plurality of bits.
character — a preselected number of bits in a particular code.
synchronous — the transmission of bits of serial data in which the time interval between successive bits is controlled by a clock.
PARS — Programmed Airline Reservation System.
SABRE — a code having six bits per character.
UART — Universal Asynchronous Receiver-Transmitter.
Modem — modulator-demodulator — a device that converts digital computer-type information into analog or audio tones that are transmittable over voice-grade telephone lines and vice versa.

LINE CONTROL CHARACTERS

S1 — Synchronization One Character to sync in the input or output messages.
S2 — Synchronization Two Character to sync in the input or output messages.
EOM — End Of Message Character indicates that this is the end of the message.
CCC — Cyclic Check Character checks for error.
GA — Go Ahead Character identifies the poll-type message and distinguishes it from a data or response-type message.

ADDRESS CHARACTERS

IA — Interchange Address Character identifies each interface controller to which the response-type message is to be sent and also where the poll-type message is to be sent.
TA — Terminal Address Character identifies each terminal unit by specifying which unit is to receive a response-type message and also identifies where the data-type message is coming from.
NIA — Next Interchange Address Character addresses poll-type input messages to the computer.

DESCRIPTION OF THE PREFERRED EMBODIMENTS

GENERAL SYSTEM AND METHOD

Referring now to FIG. 1, there is shown a credit verification system in a block diagram form suitable for practicing the present invention. A central computer 11 stores data concerning the credit status of a large number of persons, generates output messages and receives input messages. A polling unit 12 on the front end of the computer generates poll-type output messages and receives poll-type input messages indicating no input messages are ready. The output messages from the computer are applied to a converter 13 which reduces their speed, changes the code format by reducing the bits per character and changes the messages from a synchronous to an asynchronous format. The output messages are applied to a modem 14 which converts them to a format that may be transmitted over a communication channel 15 which in this case preferably is a voice-grade telephone line. From the telephone lines, the output messages are simultaneously received by a plurality of modems 17, 18 and 19 represented by three blocks in FIG. 1. Each of the modems 17, 18 and 19 are shown coupled to interface controllers 21, 22 and 23, respectively.

Interface controllers 21, 22 and 23 are, in turn, shown as coupled to separate blocks designated input-output terminals 24, 25 and 26, respectively. For some applications, each input-output terminal represented in the drawings by a block will have one or more terminal units 27 adapted to generate input data-type messages and to display output response-type messages received from the computer. The communication system shown is of the full-duplex type in that streams of data or messages can be transmitted in both directions, simultaneously.

Referring now to input-output terminal 24, the input message generated by the terminal unit 27 typically will be a decimal number in a binary coded digital form, four bits per character BCD code, and will be transmitted over the connecting lines from the terminal unit 27 through the interface controller 21, modem 17, communication channel 15, modem 14, converter 13 and computer 11. A CCC character generator 28 is shown coupled to the converter to add this character peculiar to the PARS system to the input message that is being increased in speed, changed in format to a six bit per character code and made synchronous in the converter 13.

COMPUTER WITH POLLING

The computer 11 is a high speed, high capacity, on-line, real time unit that provides an immediate response. The computer preferably will handle on the order of 150 to 200 bits per input or a total of 30,000–60,000 bits per second. Associated with the computer is a polling unit 12 that accomplishes a direct polling of all of the input-output terminals by continuously generating poll-type output messages and recognizing what are designated poll-type input messages as described more fully hereinafter.

The method and system herein described is specifically adapted to be operated in association with the programmed airline reservation system, herein referred to as the PARS system. In this regard the address characters and line control characters hereinafter described, are peculiar to the PARS system with which the input-output terminals are able to communicate.

In practicing the present invention, the system and method may be utilized to verify and collect short checks. The merchant will pay an annular fee and is provided with signs and an endorsement stamp that is put on the back of a check at the time of issue. A fixed collection fee is paid by the customer if a check is returned for any reason. The returned checks provide a data base for the computer and are identified by the customer account number on the check. Banks wishing to participate will also furnish information to the computer concerning short checks and amounts for a particular customer account number. The data base, therefore, preferably will be for a negative verification system, but it is understood that the data base may be for a positive system. The data base for the system and method herein described preferably will include the number of short checks and the amount of those short checks that are in the system for collection. Other data will include the short checks reported within a particular time period, such as six months. Another feature would be to add a digit for payroll checks of certain large companies to make certain that it is in fact a valid check from that company. Finally, the data base preferably would include a response relating to forgery, stolen checks and credit cards.

MESSAGE FORMATS

As is illustrated diagrammatically in FIG. 2, there are basically two types of output messages produced by the computer 11 and associated polling unit 12. One output message is a poll-type and the other is a response-type. Moreover, associated with these messages are address characters and line control characters that are peculiar to the format of the computer program being used which in this case is the PARS system. The PARS system is utilized because it provides a large computer capacity that is readily available at a comparatively low cost but it is understood that similar computers and systems are available to afford similar results.

Referring first to the poll-type output message shown in FIG. 2, it is shown to have control characters, Synchronous One-S1 and Synchronous Two-S2. In general, these synchronous characters are sent at the beginning of each input or output message at the start of transmission Synchronization Characters, S1 and S2 are necessary to permit all terminal units to sync in on each input or output message. A Go Ahead character, GA, succeeds the S1 and S2 characters in the poll-type message. The present system utilizes direct polling and all polling is instituted by the computer, so that the computer is programmed to generate the Go Ahead character GA. The order in which the interface controllers are polled is determined by a polling list in the program of the computer 11.

Generally, when a particular interface controller receives a GA message addressed to it, it responds by sending all input messages to the computer via operations in the associated interface controller described hereinafter. After receiving all input messages from the first interface controller on the list, the computer will send a poll-type output message addressed to the second interface controller, etc. In the poll-type output message after the GA character, there is interchange address character IA that identifies each interface controller to which the response-type message is to be sent and also where the poll-type message is to be sent. The IA character is followed by an End of Message Character, EOM, provided by the computer that indicates the end of this output message and a Cyclic Check Character, CCC, that is used to check for error.

Referring now to the response-type output message, this is shown to comprise Synchronization Characters S1 and S2, Interchange Address Character IA which is followed by a Terminal Address Character TA. The Terminal Address Character TA identifies each terminal unit by specifying which unit is to receive the response-type message and also identifies where the data-type output message is coming from. The response-type output message or the body of the message succeeds the TA character which in turn is followed by an end of message character EOM and a cyclic check character CCC.

Referring next to FIG. 3, there are basically two types of input messages to be received by the computer. One is a poll-type input message which indicates there are no input messages ready and the other is a data-type input message. Again in general, there are address characters and line control characters associated with these messages that are identifiable by the computer and its PARS system.

Referring first to the poll-type input message shown in FIG. 3, it is shown to have Synchronous Control Characters S1 and S2 and a Go Ahead Character GA. The GA Character in the input message identifies the poll-type message and distinguishes it from the data or response-type message. The Next Interchange Address Character NIA addresses poll-type input messages to the computer.

The data-type input messages are shown to comprise Synchronous Control Characters S1 and S2, an Intermediate Address Character IA, Terminal Address Character TA and the data. This data will usually be the decimal number of a particular digit that is punched into the terminal unit, but may also include an add character or subtract character corresponding to similar buttons on the terminal unit hereinafter described.

In a code chart the characters will be preferably assigned numbers in the PARS system as follows:

| Character | Octal | Character | Octal | Character | Octal |
|---|---|---|---|---|---|
| S1 | 77 | Valid IA | 1–7 | Valid TA | 20–27 |
| S2 | 76 | | 11–14 | | 30–33 |
| GA | 17 | | 16 | | 40–47 |
| EOM,EOM$_c$ | 35 | | 20–27 | | 50–53 |
| NIA | 37 | | 30–34 | | 60–67 |
| | | | 36–37 | | 70–73 |
| | | | 40–47 | | |
| | | | 50–54 | | |
| | | | 56–57 | | |
| | | | 60–67 | | |
| | | | 70–74 | | |

The CCC character is generated by the polynomial $X^6+X^5+1$.

CONVERTER

OUTPUT MESSAGES

Referring now to FIG. 4, the converter 11 is shown to have a step-down portion including a decode logic circuit 30, flip-flop 31, a logic network comprised of two AND gates 32 and 33, and an OR gate 34 and an output shift register 35. A low speed clock 36 provides low speed timing and a high speed clock 37 provides high speed timing. The low speed clock 36 is preferably 300 baud and the high speed clock 2400 or 4800 bits per second.

The decode logic circuit 30 is coupled between the output of the computer and a set input and a reset input of the flip-flop 31. The output of the computer is also applied to an input of the output shift register 35. The output shift register 35 is approximately a 50 bit register. In this way the output messages from the computer set the output shift register 35 and the flip-flop 31. The flip-flop is reset by the EOM Character. One output of the flip-flop 31 is applied to the input of AND gate 32, while the other input of AND gate is coupled to the high speed clock 37. Another output of the flip-flop 31 is coupled to an input of AND gate 33, while the other input of AND gate 33 is coupled to the output of the low speed clock. The outputs of the AND gates 32 and 33 are coupled to the input of the OR gate 34, which in turn has a clock output coupled to an input of the output shift register 35. A strip control 39 contains logic circuits to strip the higher two bits of the six bit code, strip the CCC character and strip the S1 and S2 characters. Strip control 39 has outputs coupled to the inputs of the output shift register 35 and a UART 40. The outputs of the output shift register 35 is coupled to the inputs of the UART 40 which in turn has an output with output messages that may be characterized as low speed and asynchronous, which in turn are applied to the modem 14 shown in FIG. 1. The UART functions to provide a signal that is acceptable by the modems to which they are applied.

The output messages are transmitted from the computer in a continuous, synchronous bit stream in a binary coded digital signal form serially at a relatively high rate established by the high speed clock over a transmit clock line 47 coupled back to the computer. In the preferred form shown the rate is 2400 or 4800 bits per second. The output messages are in the PARS six bit per character code. These high speed synchronous output messages in a binary coded digital signal form are simultaneously applied to inputs of decode logic circuit 30, which in turn sets the flip-flop 31 and the output shift register 35. The timing of the low speed clock through the logic network gates causes the output messages to be converted from the high speed six bit per character code to a lower speed four bit per character code and the speed is reduced to a lower transmission rate of preferably 300 bits per second as established by the low speed clock as well as changed to an asynchronous nature, in that it is no longer clock controlled. The strip control 39 serves to remove the Synchronous Characters S1 and S2, the CCC Character and the two higher digits of the six bit code from the output messages which are then applied to the universal asynchronous receiver-transmitter UART 40 which converts the message to an asynchronous format that is no longer clock controlled that may be handled by conventional modem 14 which in turn will couple to conventional telephone lines illustrated in block 15 to transmit the messages thereover. Asynchronous parity check characters may be added in the UART 40.

INPUT MESSAGES

The converter has a step-up portion comprised of a UART 46, decode logic circuit 50, a flip-flop 41, a logic network comprised of two AND gates 42 and 43 and an OR gate 44, and an input shift register 45. The decode logic circuit 50 is made up of logic circuits set by the input messages received via the UART 46, and they are coupled to a set input and a reset input of the flip-flop 41. The input messages are also applied to the input of the input shift register 45. The input shift register 45 has an approximate 150 bit rating. The flip-flop is reset by the EOM character. One output of the flip-flop 41 is applied to an input of AND gate 42, while the other input of AND gate 42 is connected to the low speed clock 36. Another output of the flip-flop 41 is connected to an input of AND gate 43 having its other input coupled to the output of the high speed clock 37. The outputs of the AND gates 42 and 43 are coupled to inputs of the OR gate 44, which in turn has an output coupled to an input of the input shift register 45. A control 48 including logic circuits adds line and address control characters including S1, S2, IA, TA and EOM by being coupled to an input of the input shift register 45 and the CCC generator 28 to add the CCC character is coupled to the input shift register 45.

The input messages originated at the terminal units and are in a binary coded digital signal form. These messages are transmitted in an asynchronous bit stream serially at a relatively low rate using a four bit per character code. These input messages are entered into the input shift register 45 and the speed is increased up to the high speed rate established by the high speed clock 37. Again the line control characters and address characters S1, S2, IA, TA, and EOM are added so that the format of the input messages is changed from a low speed four bit per character code to a high speed six bit per character code.

INTERFACE CONTROLLERS

Each of the interface controllers have a UART 51 that receives the low speed, asynchronous output messages in a binary coded digital signal form from an associated modem which in turn are coupled into the input of an address recognition shift register 52. An IA strap 53 is coupled to the shift register 52 and controls the shift register 52 so that it recognizes the IA character for that input-output terminal. If the IA is matched, then the shift register 52 will shift out both a poll-type output message and response-type message into a poll-type poll or response block 54 that will differentiate between the two types of output messages. If the message is a response-type message an output is applied to an input of TA decoder 55 having an output for each terminal unit 27 at that particular input-output terminal. In the illustration shown in FIG. 5, there are 1 through N outputs from the decoder which in the apparatus shown would preferably be 36 outputs to 36 different terminal units.

If the output messages from the shift register 52 are determined to be poll-type, an output of the poll or response block 54 is coupled into any inputs ready block 56 which in turn applies a signal over a yes line coupled as an input to an input control 57 having an input from one of the terminal units which will selectively pass the input message generated by the terminal unit into an input inquiry assembly shift register 58. The input control 57 contains the logic circuits necessary to allow only one input from a terminal unit per poll. A control 59 is coupled to a UART 61 and the input inquiry assembly register regulated by the any inputs ready block 56. The input message is assembled in the assembly register, and these outputs are coupled into an OR gate 62 which in turn has an output coupled to the input of the UART 61. If the any inputs ready block 56 applies a signal over a no line to a GA generator 63. Then a signal is applied by the GA generator to the input of the OR gate 62. In this way there will be either a no traffic response from a particular poll, identified as a GA character, or a response-type input message generated for each poll.

INPUT-OUTPUT TERMINALS AND TERMINAL UNITS

Figure 5:
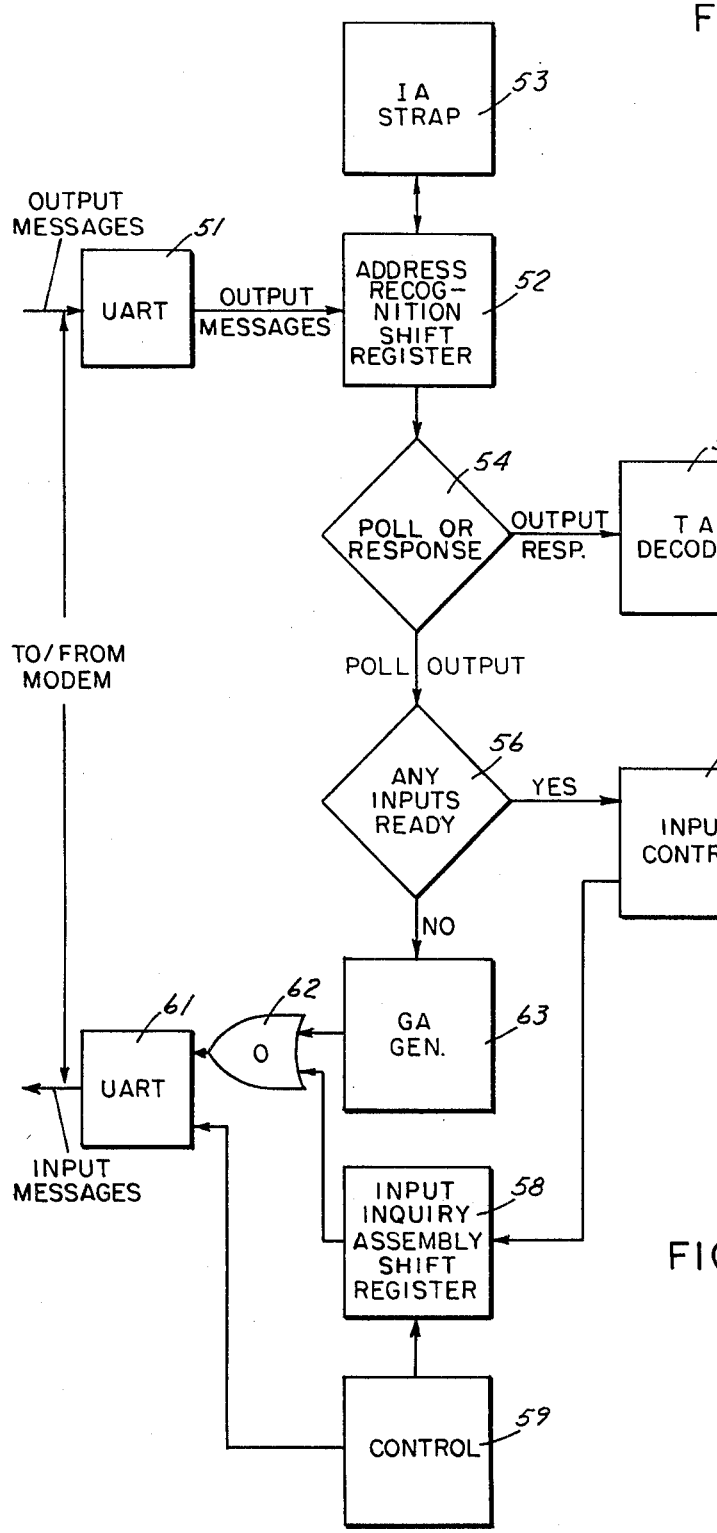
FIG. 5 is a schematic block diagram for the interface controllers and terminal units for the system of FIG. 1.

As above discussed, each of the input-output terminal blocks designated by numerals 11, 12 and 13 will comprise one or more terminal units designated by numeral 27. In the illustrative example, these may be as many as thirty-six (36) terminal units at each input-output terminal as represented by blocks 11, 12 and 13. Referring now to FIGS. 1 and 5, a further breakdown on the terminal unit shows it to include a keyboard portion 67, a calculator LSI integrated circuit, and display register 69. The output of the keyboard 67 is coupled to an input of the calculator LSI integrated circuit 68 and the output of the circuit 68 is coupled to the input of the display register 69. Moreover, in relation to the entire circuit, an output of the TA decoder 55 is connected to an input of the calculator circuit 68 and an output of the circuit is coupled to an input of the input control 57. In this way the data-type input message generated by the terminal unit is applied to the input control 57 and the response-type output message is applied to the calculator and appears as an output response.

Figure 6:
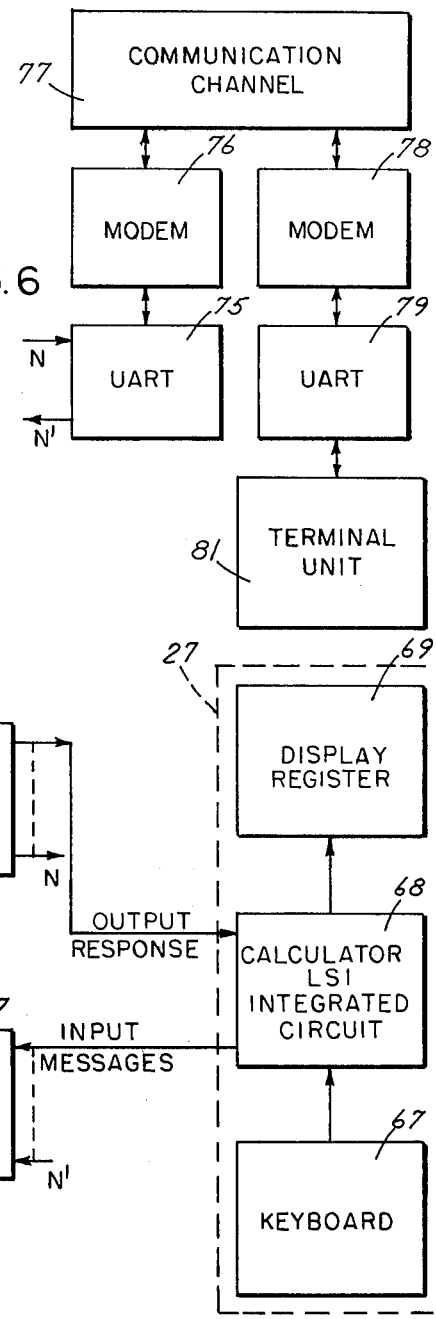
FIG. 6 is a schematic block diagram showing the placement of terminal units at different locations for the same interface controller.

The terminal units may all be at one location for the same interface controller or at different locations remote from one another. For example, referring now to FIGS. 5 and 6, taking the output terminal N and input terminal $N^1$ of the TA decoder 55 and input control 57, respectively, may be applied to a UART 75, modem 76 over a communication channel 77 again preferably a telephone line, to a modem 78, UART 79 and then to a terminal unit 81 like terminal unit 27 above-described that is remote from the interface controller. This arrangement facilitates up to 36 lines from each interface controller to optimize line use, save hardware, and optimize the polling. A typical communication system will handle four to five interface controllers each having 36 terminal units coupled thereto.

With reference now to FIG. 1, the keyboard of the terminal unit is shown to have ten depressible buttoms designated by numerals 0 through 9 inclusive, which upon successive depression will enter a decimal number of a particular digit which in turn will be displayed on the display register 69. The display register 69 is shown to accommodate a fourteen digit number. This number typically will be a customer's bank number, customer account number, or credit card number. Once the decimal number has been entered, the enter key 73 is depressed to enter the number in the calculator circuit of the terminal unit. This number remains in the calculator circuit until a yes response is received from the any inputs ready block 56 at which time the data-type input message is sent to the computer. The response-type output message 71 is shown displayed as the numeral 5. An erase button 74 is included to erase a digit number in case of error. Also included on the face of the terminal unit is an output response code-decode chart 72 using the digits from 0 to 9 which indicate the following:

0 — Okay

1 — Checks in system for collection. The number of short checks and the amount of the short checks in the system for collection appearing on the input-output display register.

2 — Checks reported returned in a six month period and the number of checks returned.

3 — Payroll okay.

4 — Forgery.
5 — Stolen credit card.
6 — Credit card okay.
7 — Credit card bad.
8 — (open)
9 — (open)

The terminal is shown to have a positive button designated + and a negative button designated —. This would be utilized particularly by bankers to add or subtract from a credit balance.

By way of illustration only and not by way of limitation, there is listed below devices which have been found suitable for use in the illustrated system:

| | |
|---|---|
| 1. Computer 11 | IBM Model 360195 |
| 2. Polling Unit 12 | IBM Model 2969 PTI |
| 3. Modems 14, 17, 18, 19, 76, 78 | 103 Type |
| 4. High Speed Clock 37 | 2400/4800 bits per second |
| 5. Low Speed Clock 36 | 300 Baud |
| 6. UARTS 41, 46, 51, 61, 75, 79 | WDC TR 1402A |
| 7. Calculator LSI integrated circuit | Mostek 5012 |

Although the present invention has been described with a certain degree of particularity, it is understood that the present disclosure has been made by way of example and that changes in details of structure may be made without departing from the spirit thereof.

What is claimed is:

1. In a credit status verification system, the combination comprising:
   an on-line real-time computer programmed with data concerning the credit of a bearer of a customer account decimal number including the number of short checks in a particular time period generating high-speed, synchronous output messages in a binary coded digital signal form, said computer generating response-type output messages relating to the credit status of a bearer, line control characters and address characters and poll-type output messages;
   converter means for the computer having
      a step-down portion to change the output messages from the computer to a slow-speed smaller bit code, asynchronous format, said step down portion including:
         a decode logic circuit to receive the output messages from the computer,
         a flip-flop to receive a set signal from the decode logic circuit and receive a reset signal from the decode logic circuit actuated by an end-of-message character in the output message,
         a high speed clock to provide high speed timing to output the messages from the computer,
         a low speed clock to provide low speed timing for the output messages from the computer,
         a logic network including a first AND gate controlled by said flip-flop and high speed clock, a second AND gate controlled by said flip-flop and low speed clock and an OR gate controlled by said first and second AND gates,
         an output shift register controlled by said output messages and the output of said OR gate,
         a character strip control to control the output shift register to remove selected characters from the output message and from the output shift register,
         and a universal asynchronous receiver-transmitter coupled to the output of said output shift register to convert the output messages from the output shift register to a form that may be transmitted by a modem;
      a step-up portion to change the input messages from the terminals to a high-speed larger bit code asynchronous format, said step-up portion including:
         a universal asynchronous receiver-transmitter to convert the input messages received from a modem to a form that may be applied to logic circuits,
         a decode logic circuit to receive the input messages from the universal asynchronous receiver-transmitter,
         a flip-flop to receive a set signal from the decode logic circuit and a reset signal from the decode logic circuit actuated by an end-of-message character in the input message,
         a high speed clock to provide high speed timing for input messages,
         a low speed clock to provide low speed timing for input messages,
         a logic network including a first AND gate controlled by the flip-flop and high speed clock, a second AND gate controlled by the flip-flop and low speed clock and an OR gate controlled by said first and second AND gates,
         an input shift register controlled by the output messages from the universal asynchronous receiver-transmitter and the OR gate,
         a character add control to control the output of the input shift register to add line control characters for the high speed input messages and
         a character generator coupled to an input shift register to add a character that checks for error;
   a telephone line to transmit output messages and transmit input messages;
   a first modem coupled between the telephone line and the converter means and a second modem coupled between the telephone line and each of a plurality of interface controllers, each said modem converting digital signals to analog signals and converting analog signals back to digital signals;
   each said interface controller for each of said second modems including:
      a universal asynchronous receiver-transmitter receiving output messages from one of said second modems,
      an address recognition shift register receiving output messages from the universal asynchronous receiver-transmitter,
      an address strap controlling the shift register to recognize an address for one of said terminal units,
      a poll or response block for distinguishing between a poll-type and a response-type output message,
      an address decoder having a plurality of outputs with one output to each terminal unit to couple a particular response-type message to a particular of said terminal units,
      an any inputs ready block responsive to a poll-type output message,
      a go-ahead generator responsive to a no signal from the any inputs ready block for generating a go-ahead character indicating no response-type messages were sent, an input control receiving data-type input messages from each terminal unit controlled by a yes signal from the any inputs ready block allowing only one input message per poll, an input inquiry assembly register responsive to the output of said input control, an OR gate responsive to the go-ahead generator and the output of the input inquiry assembly register and a universal asynchronous receiver-transmitter responsive to an output from the OR gate and a control for controlling the input inquiry assembly shift register and universal asynchronous receiver-transmitter;

a plurality of input-output terminal units associated with each interface controller for each of said second modems for generating input messages in a binary coded signal form, said input messages including line control character, address character, polling character and data-type messages, each said terminal unit including:

a keyboard with a plurality of depressible keys to enter a selected decimal number, a display register to display the decimal number produced by depressing the keys, an output response register to display a response-type output message received from the computer, and a calculator large scale integrated circuit responsive to a selected decimal number input on said keyboard transmitting said entered decimal number to said display register for storing said entered decimal number in a binary coded form until a certain response-type message is received from said computer, at which time said stored decimal number is automatically transmitted as an input message in a binary coded digital form to said computer.

2. In a credit status verification system as set forth in claim 1 wherein at least some of the terminal units are remote from the associated interface controller and coupled thereto via a telephone line.

3. In a credit status verification system as set forth in claim 1 wherein said output messages are transmitted from the computer at the rate of 4800 bits per second using a six bit code and from the converter means at the rate of 300 baud using a four bit code.

* * * * *